Sept. 12, 1967 W. W. MARTINMAAS 3,341,247
TRACTOR CAB
Filed Feb. 25, 1966 4 Sheets-Sheet 1

Inventor:
Werner W. Martinmaas
By: Hofgren, Wegner, Allen,
Stellman & McCord
Attorneys

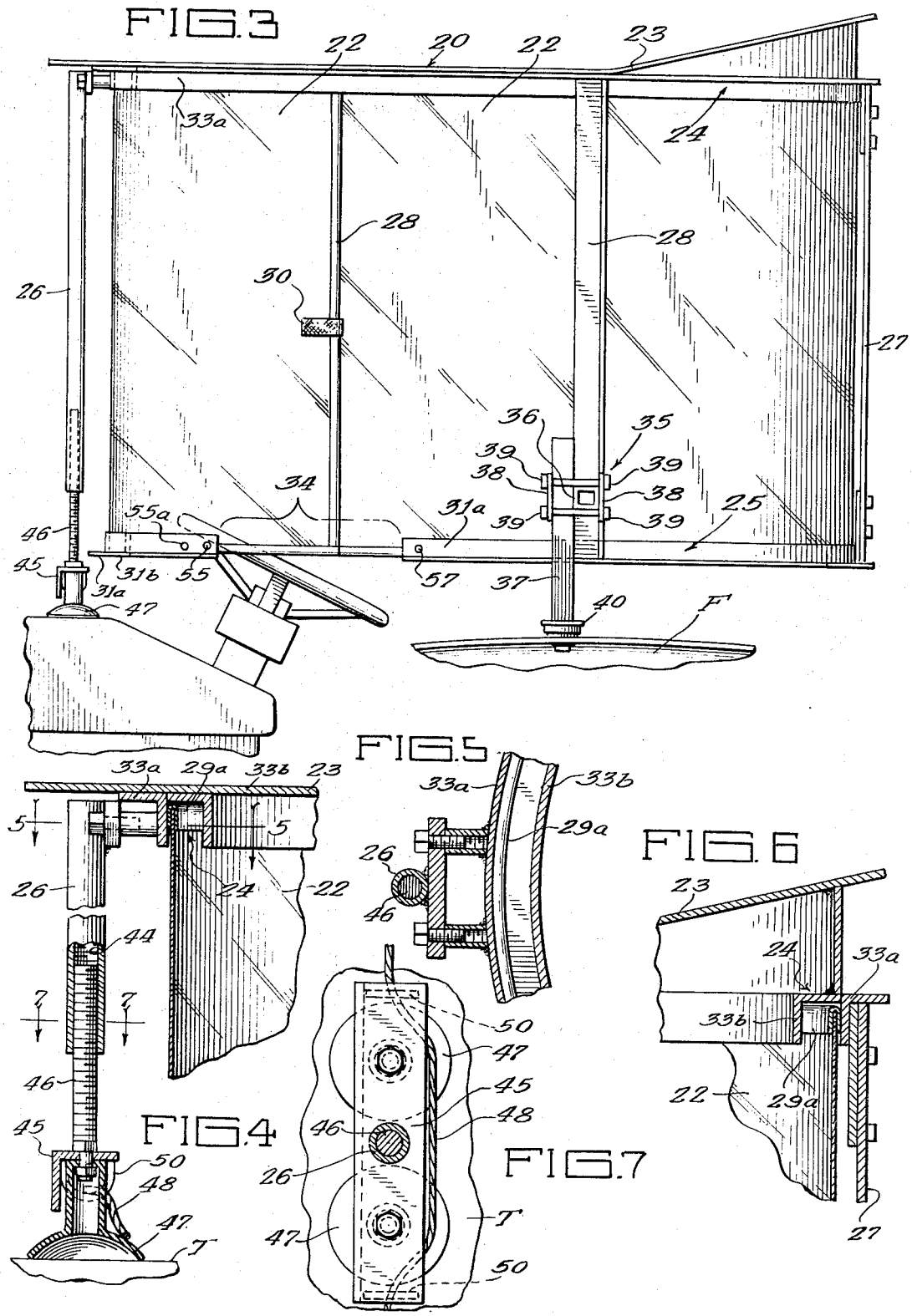

Sept. 12, 1967  W. W. MARTINMAAS  3,341,247
TRACTOR CAB
Filed Feb. 25, 1966  4 Sheets-Sheet 3
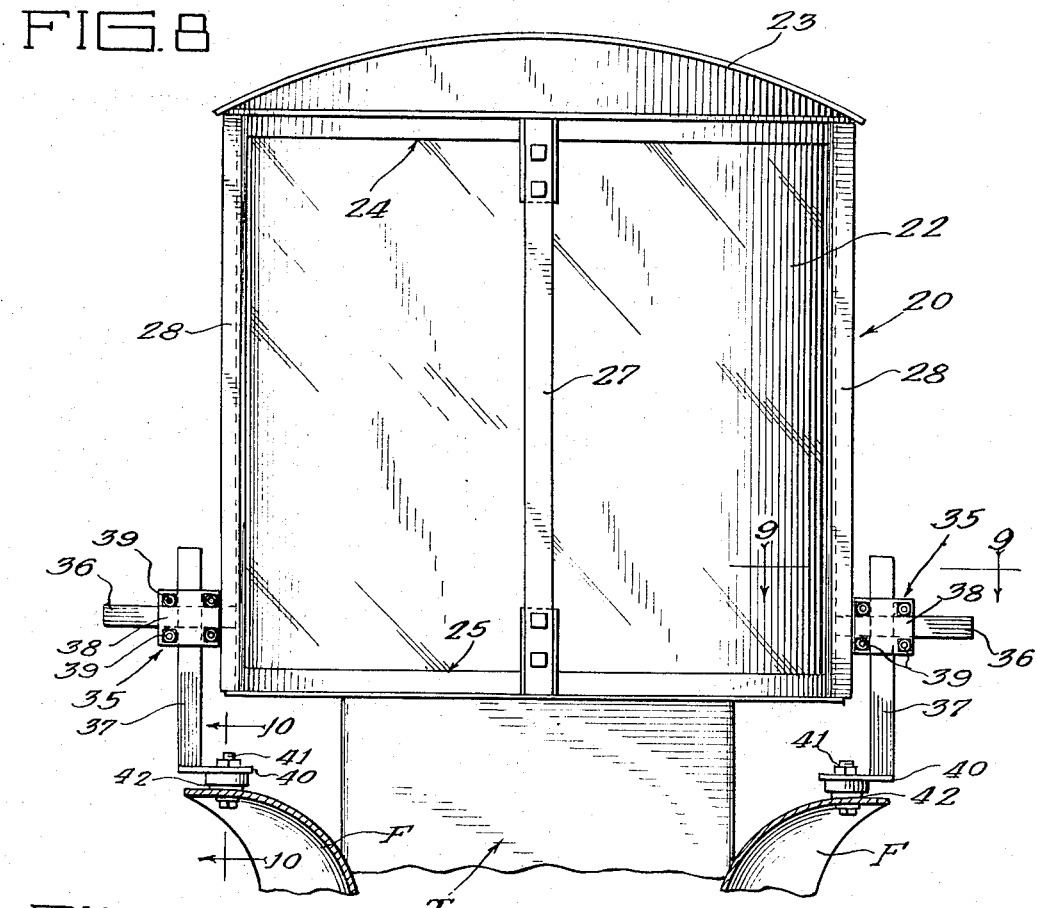
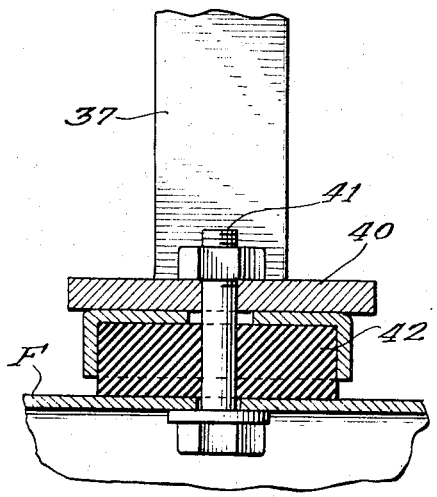
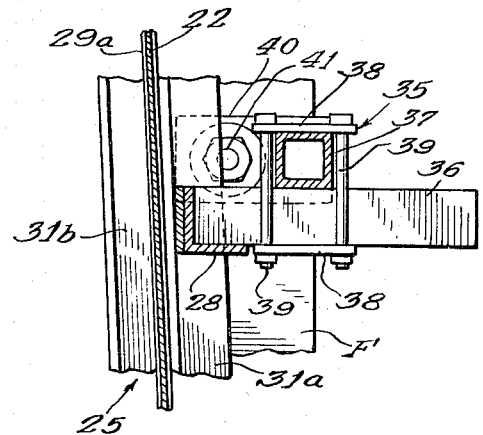

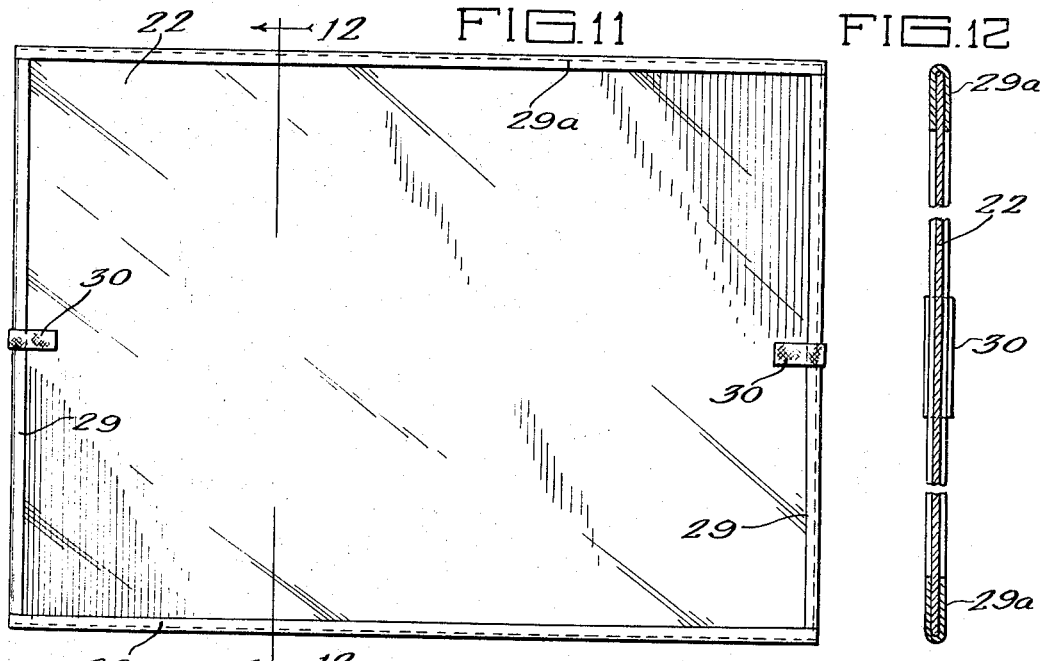
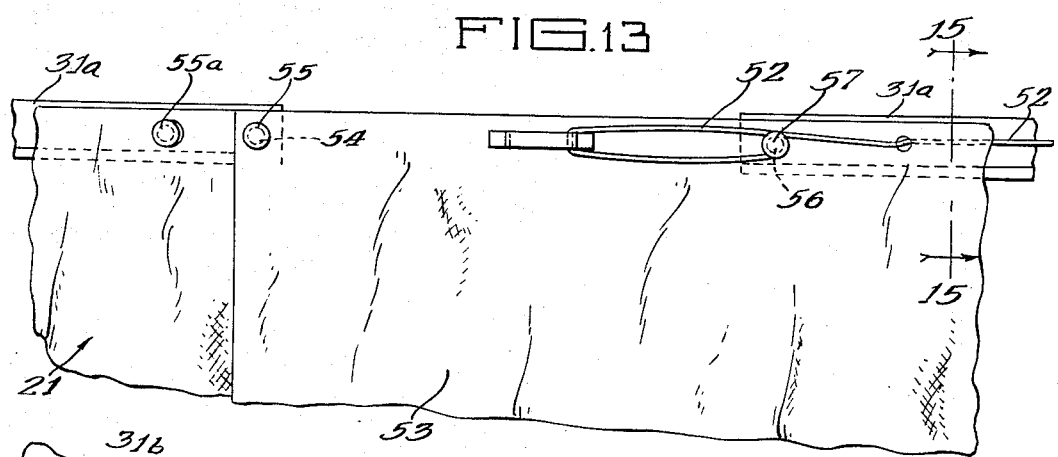
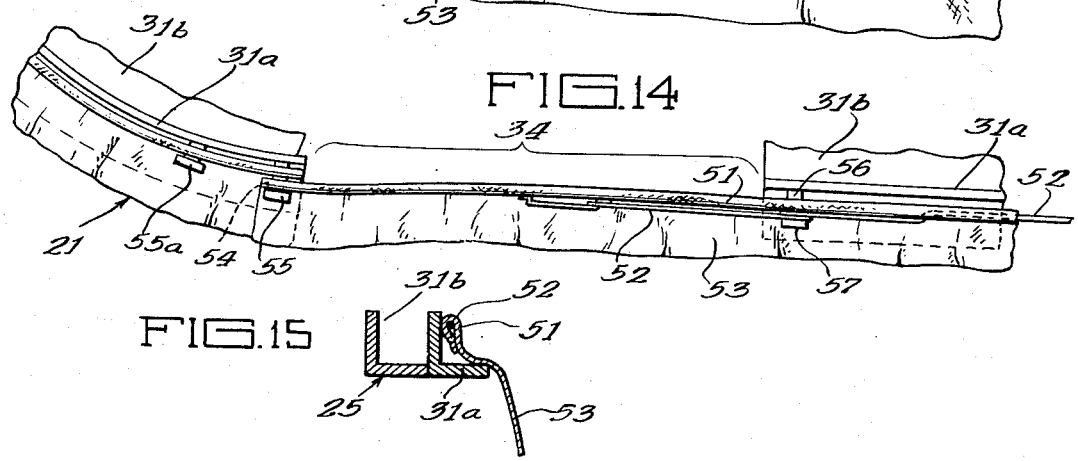
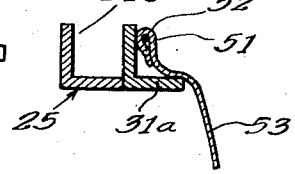

United States Patent Office 3,341,247
Patented Sept. 12, 1967

3,341,247
TRACTOR CAB
Werner W. Martinmaas, 835 10th Ave.,
Watertown, S. Dak. 57201
Filed Feb. 25, 1966, Ser. No. 530,083
16 Claims. (Cl. 296—28)

ABSTRACT OF THE DISCLOSURE

A universal cab for the operator's area of tractors which has adjustable mountings making it readily adaptable to nearly any tractor, a frame consisting of vertically spaced tracks which define the perimeter of an oval cab, flexible and resilient panels which form the cab enclosure and are slidable in the tracks to fully enclose the operator's area or shield any desired portion of it, the panels being easily removable when desired. The cab is supported above the cowl and fenders, and the lower part of the operator's area is optionally surrounded by a skirt which hangs loosely and removably from the cab.

---

Because of the year-round use of tractors in urban as well as rural areas, cab enclosures are desirable to keep the operator warm in the winter and cool in the summer. By and large, the presently available tractor cabs are permanently attached or cumbersomely removable enclosures which are awkward to mount and adjust. Such cumbersome adjustable structures are especially undesirable when the vehicles are used on a twenty-four hour basis during daily weather changes. In some instances, this problem has been attacked by providing hinged or slidable windows and doors to permit ready ventilation through the cab enclosure. But in these instances, the ventilation provided by such windows is quite limited. A further disadvantage with most tractor cabs now available is that their frame or mounting structure prevent full and unobstructed 360° vision which is vital to the safe operation of such vehicles. The structure of this invention overcomes these disadvantages by providing a total enclosure including a plurality of flexible transparent panels slidable in a track means sufficiently wide to accommodate all of the panels in an overlapping relation around the entire operating area of the tractor. The panels are easily manipulated by the operator of the tractor from within the closure to provide for ventilation or shielding in any direction. The panels provide for a full 360° vision for the operator. In addition, the structure is provided with a universal mounting means to adapt a single cab for a wide variety of tractors and tractor-like vehicles.

Thus, the principal object of this invention is to provide a new and improved vehicle cab structure of the character described.

A further object is to provide a tractor cab having a plurality of flexible transparent panels slidable in a track means to various shielding positions about the operating area of the vehicle and to provide full 360° vision for the operator.

Another object of this invention is to provide a cab structure of the character described including a universal means to adapt a standard cab to various sizes and types of vehicles.

Still a further object is to provide a cab structure having a new and improved means for mounting a lower curtain or skirt portion subjacent the cab structure.

Further objects and advantages will become apparent from the following detailed description taken in connection with the accompanying drawings in which:

FIG. 3 is a side elevational view of the device with the lower skirt portion removed;

FIG. 4 is a fragmentary sectional view, on an enlarged scale, taken substantially along the line 4—4 of FIG. 2, with parts broken away, illustrating the front mounting means;

FIG. 5 is a fragmentary sectional view taken generally along the line 5—5 of FIG. 4;

FIG. 6 is a fragmentary central sectional view through the extreme top rear portion of the cab;

FIG. 7 is a sectional view taken generally along the line 7—7 of FIG. 4;

FIG. 8 is a rear elevational view of the device illustrating the means for mounting the cab on the fenders of the tractor;

FIG. 9 is a fragmentary sectional view on an enlarged scale taken generally along the line 9—9 of FIG. 8;

FIG. 10 is a fragmentary sectional view on an enlarged scale, taken generally along the line 10—10 of FIG. 8;

FIG. 11 is an elevational view of one of the flexible transparent panels removed from the track means;

FIG. 12 is a sectional view of the panel taken generally along the line 12—12 of FIG. 11;

FIG. 13 is a fragmentary side elevational view illustrating the means for securing the skirt portion to the bottom of the cab, and the area providing access to the cab;

FIG. 14 is a top plan view of the skirt portion as in FIG. 13; and

FIG. 15 is a fragmentary sectional view taken generally along the line 15—15 of FIG. 13.

In the preferred embodiment of the invention, as disclosed in FIGS. 1 and 2, a tractor cab, or enclosure structure, is shown to comprise an upper cab portion 20 and a lower curtain or skirt portion 21 mounted by appropriate means (hereinafter described) about the operating area for the operator of a tractor or tractor-like vehicle T. The enclosure is preferably oblong in shape, as shown in FIG. 2, in order to provide full access to the controls in front of and behind the tractor seat S. The enclosure may be oval or square. The upper cab portion 20 includes a plurality of flexible transparent plastic-like panels 22 which permit 360° vision by the operator while providing the surrounding vertical enclosure for the cab. The panels, as hereinafter shown, are slidably mounted about the operating area in such a manner as to permit overlapping of the panels when a total enclosure is not desired. The upper cab portion includes a sheet metal roof 23 inclined upwardly to the rear to provide for proper drainage as well as more head room above the tractor seat.

Figure 1:
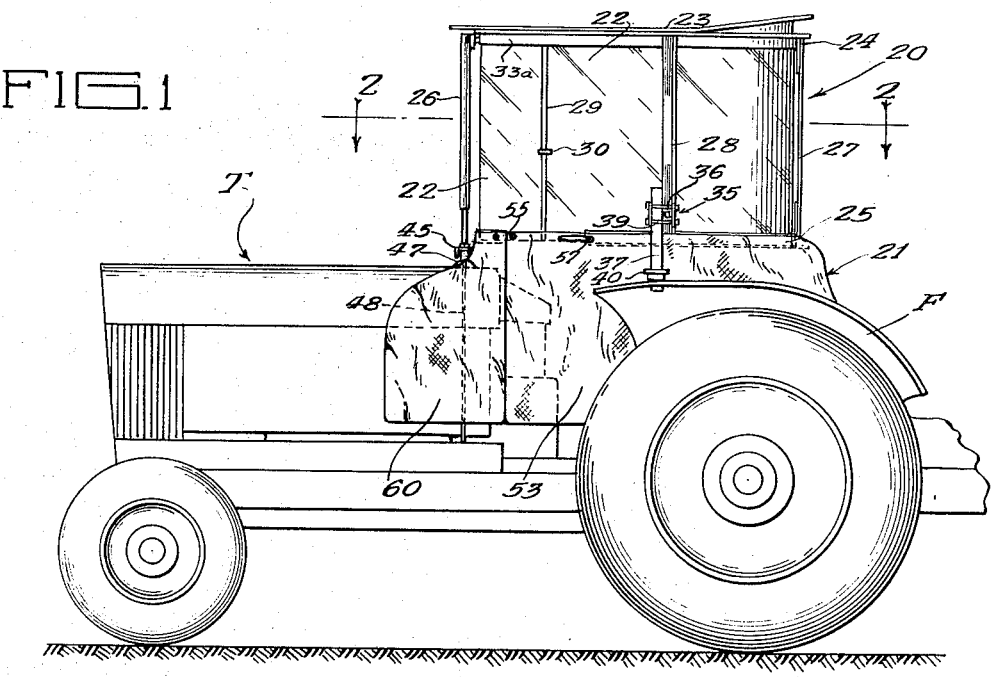
FIG. 1 is a side elevational view of a conventional form tractor with the cab of this invention mounted on it.
Figure 2:
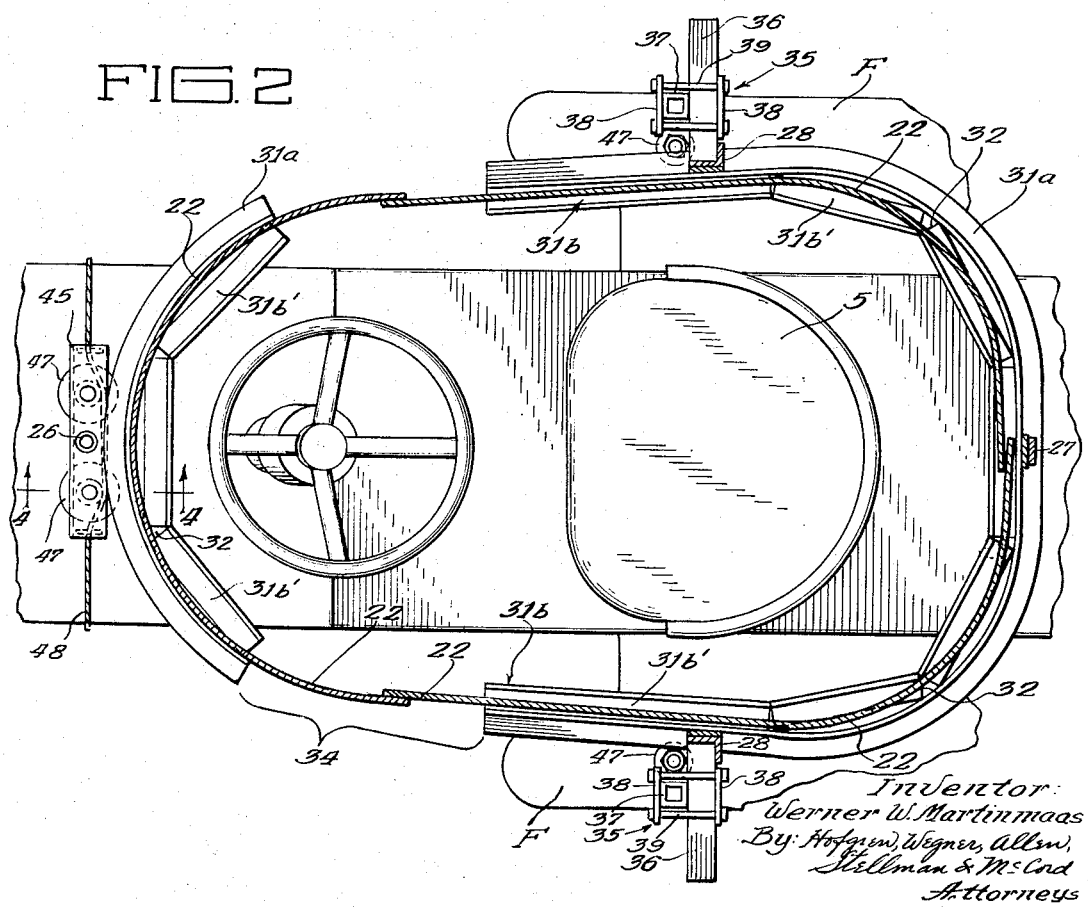
FIG. 2 is a horizontal sectional view taken generally along the line 2—2 of FIG. 1.

In general, the mounting structure for the cab and the track means for the sliding flexible panels 22 include a top channel shaped track means, generally designated 24 in FIG. 1, and a bottom channel shaped track means 25 which are spaced apart by four posts; a center front post 26, a center rear post 27, and two side posts 28. The track means define the cab area of the enclosure. The front post and the two side posts provide means for mounting the cab onto the tractor. The rear post 27 is merely a spacer between the top and bottom tracks 24 and 25, respectively. The roof 23 is mounted above the top track 24. The top and bottom track means 24 and 25 in the embodiment illustrated are sufficiently wide to accommodate three of the identical transparent panels 22 in a sliding overlapped relation.

Referring to FIGS. 11 and 12, each transparent flexible panel 22 has two protective metal strips 29 along its two upright edges, and includes a strip of web belting 29a bonded along its upper and lower edges to serve as spacers between the panels when they are in an overlapped relation. Each panel also includes a web tab 30 centrally bonded at its two upright edges to provide a finger piece for grasping by the operator of the tractor. The tabs 30 also cooperate with the top and bottom webs 29 to space the panels so that they do not rub and scratch each other while sliding in the tracks.

The lower channel shaped track means 25 is best illustrated in FIGS. 2 and 15 and is constructed of outer and inner L-shaped track members 31a and 31b, respectively, whereby the vertical legs of the L-shaped members and the horizontal leg of member 31b forms a channel sufficiently wide to accommodate three panels 22. As seen in FIG. 2, the outer track member 31a is fabricated as a single continuous member extending substantially about the operating area in a generally oblong path. The inner L-shaped track member 31b is fabricated of a series of straight angle sections 31b' welded end-to-end and welded to the inside of the outer L-shaped track member 31a. Thus, at the joint between each two sections 31b', an opening 32 is formed through which accumulated dust or chaff may fall on sliding the panels in the track thereby permitting self-cleaning of the lower track.

The upper channel shaped track means 24 is best illustrated in FIGS. 4 and 6 and is constructed somewhat similar to the lower track means 25. The upper track is constructed of outer and inner angle track members 33a and 33b, respectively. Both track members 33a, 33b are fabricated as single continuous members extending substantially about the operating area in a generally oblong path corresponding to the path of the lower track means.

As seen in FIGS. 2, 3 and 14, there is a complete break in the bottom track means forming a gap 34 to afford ingress to the cab. When a flexible panel is drawn around to the front of the cab in the area of gap 34, the panel simply bridges the gap and enters the tracks means on the other side of the gap. The gap also makes its possible to completely remove all of the panels by sliding them straight forward at the gap instead of manually curving them to engage the forward curve of the track. Thus, the flexible panels may all be removed for summer operation when only the shade of the roof 23 is needed. Alternatively, all three panels may slide either to the front or to the rear, so that any portion of the cab may be opened to any desired extent. Obviously, various track contructions may be employed to accommodate various numbers of panels.

As described below, the tractor cab construction of this invention is provided with a universal mounting structure which provides for easy adjustment to the various heights, widths, and structural configurations of the various tractor-like vehicles presently available.

To provide for adjustability of the cab with respect to various widths of tractor fenders upon which the side posts 28 are mounted, a two-way, horizontal and vertical, slide bracket 35 (FIGS. 3, 8 and 9) is mounted between a horizontal shaft or crossbar 36 secured to and extending outwardly from each of the cab side posts 28 and an upright shaft 37 surmounting each tractor fender F. The bracket 35 is comprised of two generally parallel plates 38 spaced apart by four bolts 39 extending through the plates at each of its corners. The plates 38 and bolts 39 embrace the crossbar 36 and vertical shaft 37, as best illustrated in FIGS. 8 and 9. It can be seen that various differences in fender height can be compensated for in mounting the cab onto the tractor by sliding the brackets 35 vertically on the upright shafts 37, and various differences in span across the fenders may be compensated for by properly sliding the bracket 35 along cross bars 36. Tightening the bolts 39 tightens the plates 38 to fix the position of the cab. Thus, a universal mounting is provided to maintain the cab portion at a desired vertical and lateral disposition in relation to the operating area of the tractor. For tractors which have no fenders, a bracket (not illustrated) may be fastened to the tractor frame inside the wheel to afford a mounting for the upright cab side post 28.

The upright shaft 37 which mounts on the tractor fenders has a transverse flange 40 (FIGS. 8 and 10) at the base thereof. Bolts 41 pass through fenders F, through a rubber vibration and noise damper 42, and is received by the flange 40 to "silently" mount the cab to the fenders.

The front supporting post 26 of the cab is vertically adjustable, as best illustrated in FIGS. 3 through 5, and is comprised of a tubular member which is internally threaded, as at 44 in FIG. 4, and has a mounting bracket in the form of a transverse L-shaped member 45 with a threaded stem 46 that screws into the threaded tubular front post 26. Thus, the front support 26 for the cab may also be adjusted to accommodate variations in the height of the tractor hood. Two relatively large rubber antivirbation friction supports 47 are mounted to the underside of transverse member 45 and rest upon the hood of the tractor, as best illustrated in FIGS. 1 and 3. The rubber supports may be formed as suction cups to further resist transverse movement of the front of the cab in relation to the tractor hood. As illustrated in FIGS. 4 and 7, a rope 48, such as braided plastic, may be passed through eyes 50 in the transverse member 45 and passed entirely under the tractor body to lash the front of the cab to the tractor by employment of a turn-buckle (not illustrated) for tightening the rope around the body of the tractor. Such a lashing means is desirable to eliminate the necessity of drilling holes and fastening bolts into the hood of the tractor. Many times, vital operative parts of the tractor are positioned directly beneath the hood, so holes cannot be made for mounting bolts.

In order to enclose the operating area of the tractor below the cab portion 20, the lower curtain or skirt 21 is provided of a preferably heavy coated fabric or sheet plastic having a marginal loop 51 continuously along its upper edge, as illustrated in FIG. 15. The lower horizontal leg of the outer L-shaped bottom track member 31a forms an outwardly extending flange above which the curtain 21 is mounted, as by a drawstring 52 threaded through the loop 51 and secured at its ends to headed studs 55a and 57. The drawstring encircles the outer track member 31a about the cab portion 20 and is drawn tightly thereabout like the belt on a garment. The curtain is provided with a loose flap 53 below the gap 34 in the lower track means 25 to permit ingress to the cab when the curtain 21 is employed. The flap has a grommet 54 which engages a forward headed stud 55 and another grommet 56 which engages the rear headed stud 57, so that the curtain may completely enclose the cab and yet provide an easily manipulable door flap. Referring to FIG. 1, the curtain may include an extendable portion 60 which may be unfolded in cold weather to extend forward along the two sides of the motor to entrap and direct into the cab hot air generated by the tractor motor.

Thus, it can be seen that I have provided a new and improved, attractive, inexpensive and remarkably versatile tractor cab having full 360° vision for the operator of the tractor, while providing a universal mounting therefor to adjust the cab for employment with a wide variety of tractor and tractor-like vehicles. It must be understood that the novel overlapping sliding flexible panels disclosed by this invention are equally as desirable for use with permanent or temporary platforms for a wide variety of outdoor working areas. Interior and exterior warehousing platforms having control points are but some examples of the utility of this invention.

The foregoing detailed description is given for clearness of understanding only and no unnecessary limitations are to be understood therefrom, as some modifications will be obvious to those skilled in the art.

I claim:

1. A universal enclosure structure for tractors comprising: frame means including a top frame and a bottom frame connected by upright frame members, said top and bottom frames being constructed and arranged to extend about the perimeter of the operator's area of a tractor, there being a gap in said bottom frame for entering and leaving the operator's area; a cover panel overlying and secured to the top frame; an upright front post of adjustable length which is secured to said frame means and is adapted to rest upon a part of the tractor near the front of the operator's area; upright side posts of adjustable length which are secured to the frame means and which cooperate with the front post to orient the frame means with the top and bottom frames generally horizontal with the bottom frame substantially above the floor of the tractor; laterally adjustable means on said side posts for securing them to tractor fenders which are adjacent said posts; a plurality of panels mounted in said frame means and cooperating to form an enclosure which entirely surrounds the upper part of the operator's area, at least some of said panels being movable to selectively provide openings in said enclosure; curtain-like skirt means which is detachably secured to and hangs loosely from the bottom frame and completely surrounds the lower part of the operator's area, said skirt means including a portion hanging across the gap in the bottom frame; and means for detaching said portion from the bottom frame at one side of the gap for entering or leaving the operator's area.

2. The enclosure structure of claim 1 in which the bottom frame has external flange means, and a drawstring in the top of the skirt pulls the top over said flange means.

3. The enclosure structure of claim 1 in which the bottom frame is above the level of the tractor cowl and fenders, the front support means rests on the tractor cowl, and cord means secured to the front of the enclosure encircles the tractor body to lash the enclosure to it.

4. The enclosure structure of claim 1 in which the top and bottom frame are opposed, parallel, channel-like tracks each of which is continuous except for the gap in the bottom frame, and in which the panels are slidably mounted in the tracks for movement between extended positions in which they cooperate to completely enclose the operator's area, and retracted positions in which two or more panels are in register with one another.

5. The enclosure structure of claim 4 in which the horizontal area bounded by the top track is generally oval, with convexly curved portions at the front and rear, and in which the panels are flexible so they may slide in said convexly curved track portions without damage.

6. The enclosure structure of claim 5 in which the lengths of the panels circumferentially of the track, and the width of the gap in the bottom track are so related that a panel bridges the gap but may be removed from the track by flexing it to position an edge outside the track at the edge of the gap and to free it from the top track.

7. The enclosure structure of claim 4 in which the panels are flexible and resilient, the tracks include portions that are convexly curved relative to the operating area in an arc that permits free movement of the panels, while the resilience of the panels causes them to engage the outer faces of the track channels.

8. The enclosure structure of claim 7 in which the bottom track consists of a continuous, upright outer web, and a plurality of angle members welded together end-to-end and to the outer web with a first leg of each angle member forming the inner side of the channel track and a second leg of each angle member forming the bottom of the track, the ends of the angle members being cut straight across to leave gaps between ends of said second legs of the angle members adjacent the outer web, said gaps providing openings through which dirt and chaff may fall out of the track.

9. The enclosure structure of claim 4 in which each track is a single channel which receives all the panels and is substantially wider than the combined thickness of all the panels, so the panels may all be poistioned in register with one another in a single area of the tracks.

10. A universal enclosure structure for tractors, comprising: frame means including opposed, parallel top and bottom track means connected by upright frame members, said track means being constructed and arranged to etxend about the perimeter of the operator's area of a tractor with the bottom frame substantially above the floor of the tractor, said track means enclosing an oval area with arcuate front and rear portions, and there being a gap in the bottom track means for entering and leaving the opeartor's area; a cover panel overlying and secured to the top track; means for supporting said frame means on a tractor; and a plurality of flexible and resilient shielding panels slidably mounted in said track means for movement between extended positions in which they cooperate to completely enclose the operator's area, and retracted poistions in which two or more panels are in register, said panels being much thinner than the width of the track means and being tight in said track means only by reason of their resilience.

11. The enclosure structure of claim 10 in which each track means is a single channel which receives all the panels, and in which all the panels may be in register with one another in a single area of the track.

12. The enclosure structure of claim 10 in which the lengths of the panels circumferentially of the track means, and the width of the gap in the bottom track means are so related that a panel bridges the gap but may be removed from the track by flexing it to position an edge outside the track at the edge of the gap and to free it from the top track.

13. A universal enclosure structure for tractors comprising: frame means including a top frame and a bottom frame connected by upright frame members, said top and bottom frames being constructed and arranged to extend about the perimeter of the operator's area of a tractor, there being a gap in said bottom frame for entering and leaving the operator's area; a cover panel overlying and secured to the top frame; means for mounting said frame means on a tractor with the bottom frame substantially above the floor of the tractor; a plurality of panels mounted in said frame means and cooperating to form an enclosure which entirely surrounds the upper part of the operator's area, at least some of said panels being movable to selectively provide openings in said enclosure; curtain like skirt means which is detachably secured to and hangs loosely from the bottom frame and completely surrounds the lower part of the operator's area, said skirt means including a portion hanging across the gap in the bottom frame; and means for detaching said portion from the bottom frame at one side of the gap for entering or leaving the operator's area.

14. A universal cab structure for the operator's area of tractor vehicles, comprising: a front post of adjustable length which is adapted to rest upon a part of a tractor near the front of the operator's area; a pair of side posts of adjustable length; laterally adjustable means on said side posts for securing them to tractor members which are positioned laterally outwardly of said side posts; top and bottom frames supported on said posts and defining the perimeter of a cab area, there being a gap in said bottom frame for entering or leaving the cab area; a top panel secured to said top frame; and a plurality of panels mounted in said frames and cooperating to form an enclosure for the cab area, at least some of said panels being movable to selectively provide openings in said enclosure.

15. The cab structure of claim 14 which includes a curtain-like skirt hung loosely from the bottom frame and surrounding an area beneath and contiguous with the cab area.

16. The enclosure structure of claim 14 in which the front post includes a friction member which seats on the vehicle hood.

References Cited

UNITED STATES PATENTS

| | | | |
|---|---|---|---|
| 1,523,410 | 1/1925 | Elliott | 49—127 |
| 1,523,704 | 1/1925 | Morine. | |
| 1,646,794 | 10/1927 | Racz | 296—84 X |
| 1,750,040 | 3/1930 | Gore | 49—127 X |
| 2,021,290 | 11/1935 | Chambers | 296—102 |
| 2,267,227 | 12/1941 | Williams | 96—102 |
| 2,563,848 | 8/1951 | Johnson. | |
| 2,698,060 | 12/1954 | Burch | 180—54 |
| 3,191,987 | 6/1965 | Dodge | 296—102 |

FOREIGN PATENTS

| | | |
|---|---|---|
| 825,489 | 12/1951 | Germany. |
| 550,021 | 10/1956 | Italy. |

BENJAMIN HERSH, *Primary Examiner.*

J. A. PEKAR, *Assistant Examiner.*